United States Patent
Pullen

(10) Patent No.: US 11,674,560 B2
(45) Date of Patent: Jun. 13, 2023

(54) FLYWHEEL ASSEMBLY

(71) Applicant: City, University of London, London (GB)

(72) Inventor: Keith Robert Pullen, London (GB)

(73) Assignee: CITY, UNIVERSITY OF LONDON, London (GB)

( * ) Notice: Subject to any disclaimer, the term of this patent is extended or adjusted under 35 U.S.C. 154(b) by 0 days.

(21) Appl. No.: 17/680,219

(22) Filed: Feb. 24, 2022

(65) Prior Publication Data
US 2022/0243784 A1  Aug. 4, 2022

Related U.S. Application Data

(63) Continuation of application No. 15/055,328, filed on Feb. 26, 2016, now Pat. No. 11,293,517, which is a
(Continued)

(51) Int. Cl.
*F16F 15/30* (2006.01)
*H02K 7/02* (2006.01)
(Continued)

(52) U.S. Cl.
CPC ............ *F16F 15/315* (2013.01); *B60L 50/30* (2019.02); *F16F 15/30* (2013.01); *H02K 7/003* (2013.01);
(Continued)

(58) Field of Classification Search
CPC .......... F16F 15/30; F16F 15/31; F16F 15/315; H02K 7/003; H02K 7/025; B60L 11/16;
(Continued)

(56) References Cited

U.S. PATENT DOCUMENTS

| 4,538,079 A | 8/1985 | Nakayama et al. |
| 7,267,028 B2 | 9/2007 | Gabrys |

(Continued)

FOREIGN PATENT DOCUMENTS

| EP | 0 155 327 A1 | 9/1985 |
| EP | 0 161 326 A1 | 11/1985 |

(Continued)

*Primary Examiner* — Adam D Rogers
(74) *Attorney, Agent, or Firm* — Seed IP Law Group LLP

(57) ABSTRACT

A flywheel assembly 10 comprising: at least one flywheel mass support 14, the or each said support having a shaft 19 that extends along a rotational axis 18 about which the support 14 can rotate in use, the or each said support 14 comprising a plurality of openings 24 that are each offset from said rotational axis 18, a flywheel mass 12 comprising a plurality of openings 16 that are each arranged to align with a corresponding opening in said support; and means 23 for coupling said flywheel mass 12 to the or each said support 14 so that the mass 12 can rotate with the or each support 14 in use, said coupling means 23 being configured to extend through the aligned openings in the or each support 14 and said flywheel mass 12; wherein said flywheel mass 12 comprises a plurality of generally planar flywheel mass elements sandwiched together to form a stack of elements, each said element including a plurality of openings 16 that align with the openings 24 in the or each said support 14 and with openings in neighbouring elements in said stack, said flywheel elements being coupled together and aligned with
(Continued)

one another to form said flywheel mass solely by means of the coupling means 23 that extends through the aligned openings in said elements and the or each said support 14.

15 Claims, 8 Drawing Sheets

Related U.S. Application Data continuation of application No. 14/345,630, filed as application No. PCT/EP2012/068340 on Sep. 18, 2012, now abandoned.

(51) Int. Cl.
    *F16F 15/315*     (2006.01)
    *H02K 7/00*     (2006.01)
    *B60L 50/30*     (2019.01)

(52) U.S. Cl.
    CPC .............. *H02K 7/025* (2013.01); *Y02E 60/16* (2013.01); *Y02T 10/64* (2013.01); *Y02T 10/70* (2013.01); *Y10T 74/2119* (2015.01)

(58) Field of Classification Search
    CPC ........ B60L 50/30; Y02T 10/64; Y02T 10/641; Y02T 10/70; Y02T 10/7027; Y02T 10/7033; Y10T 74/2119; Y02E 60/16
    See application file for complete search history.

(56) References Cited

U.S. PATENT DOCUMENTS

| | | | |
|---|---|---|---|
| 11,293,517 B2 * | 4/2022 | Pullen | ................... F16F 15/315 |
| 2011/0031827 A1 | 2/2011 | Gennesseaux | |
| 2013/0015825 A1 | 1/2013 | Pullen | |
| 2014/0366683 A1 * | 12/2014 | Pullen | ..................... F16F 15/30 |
| | | | 74/572.11 |
| 2019/0109511 A1 | 4/2019 | Kinpara | |
| 2019/0319505 A1 | 10/2019 | Degner et al. | |
| 2020/0036249 A1 | 1/2020 | Krais et al. | |
| 2020/0036250 A1 | 1/2020 | Krais et al. | |
| 2020/0112214 A1 | 4/2020 | Galmiche et al. | |
| 2020/0112216 A1 | 4/2020 | Galmiche et al. | |
| 2020/0161936 A1 | 5/2020 | Galmiche et al. | |
| 2022/0337138 A1 * | 10/2022 | Keskinoglu | .............. H02K 1/27 |

FOREIGN PATENT DOCUMENTS

| | | | |
|---|---|---|---|
| GB | 520513 A | | 4/1940 |
| GB | 2 286 870 A | | 8/1995 |
| IL | 289441 A | * | 12/2022 |
| JP | 58-215948 A | | 12/1983 |
| JP | 8-338477 A | | 12/1996 |
| WO | 02/29278 A1 | | 4/2002 |
| WO | 2009/125254 A1 | | 10/2009 |

* cited by examiner

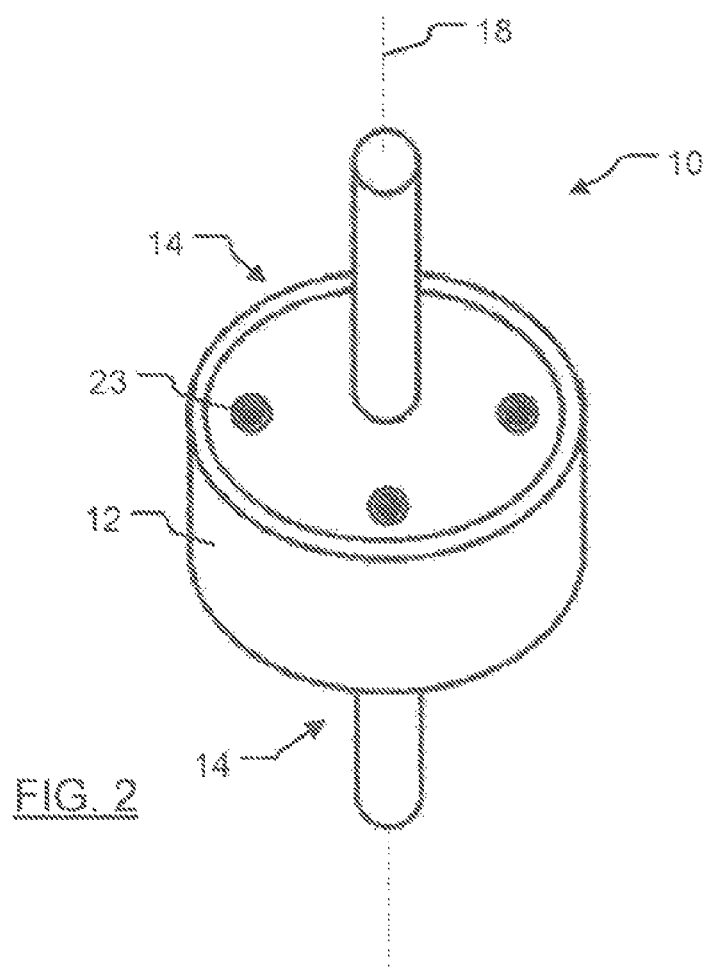
FIG. 2
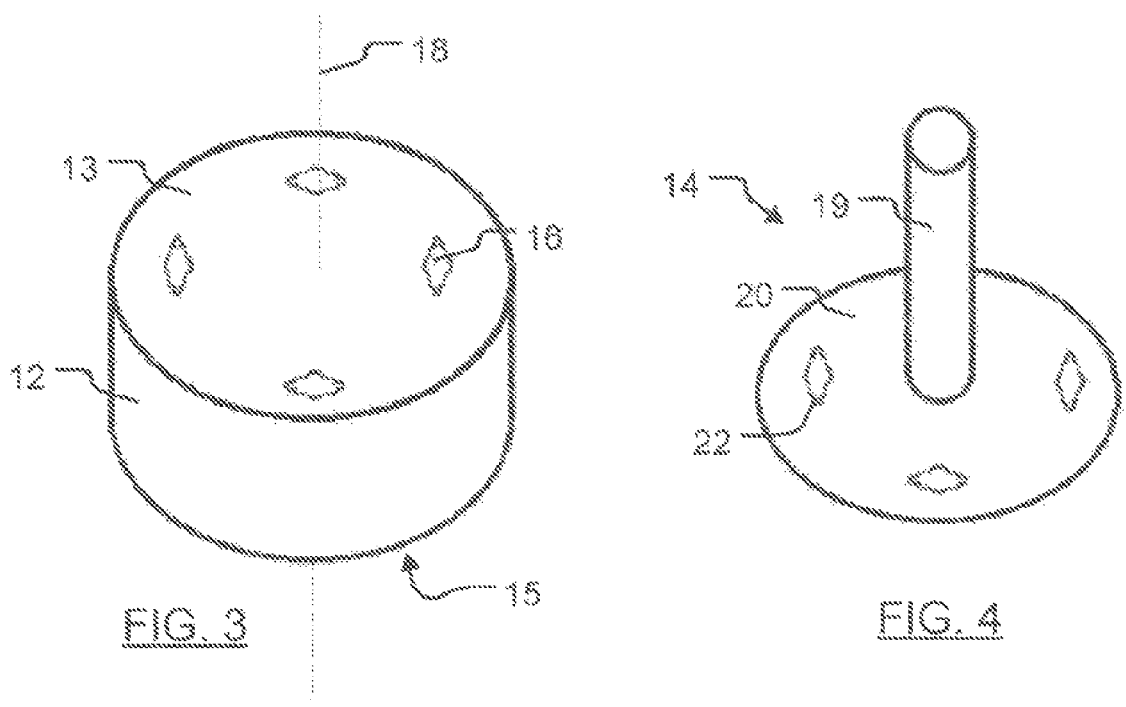
FIG. 3
FIG. 4

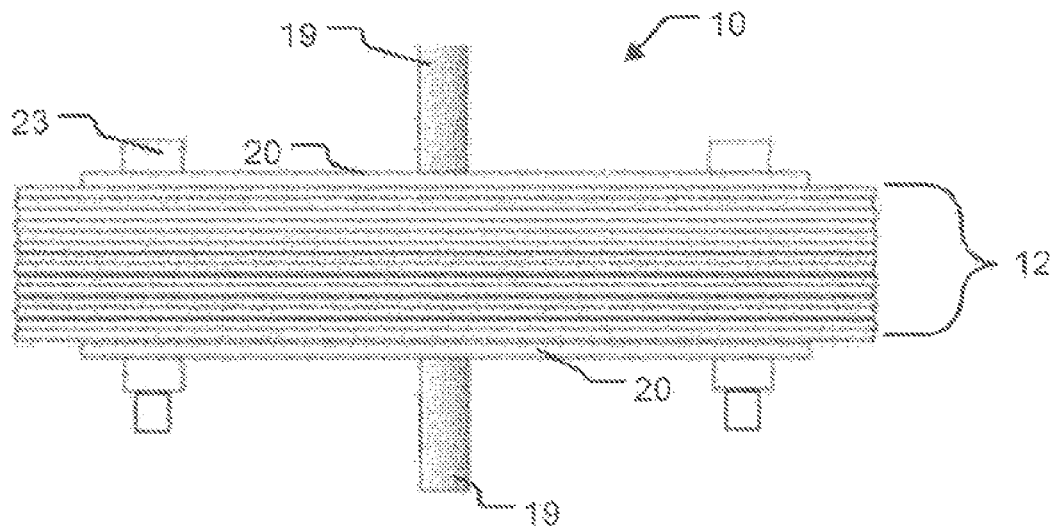
FIG. 10
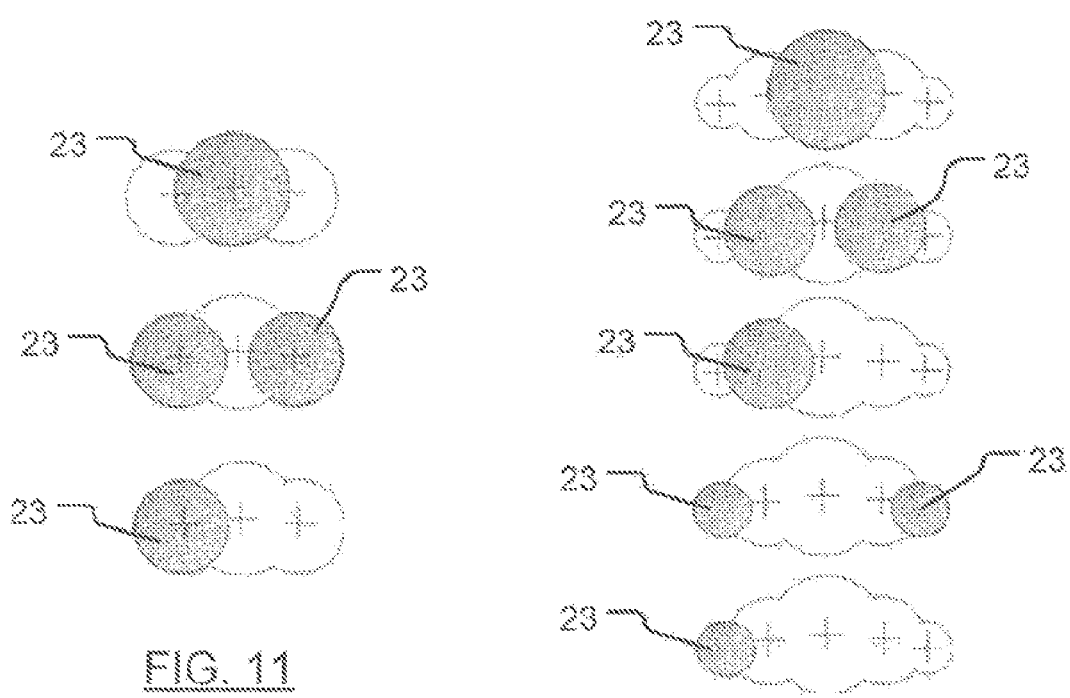
FIG. 11
FIG. 12

FLYWHEEL ASSEMBLY

CROSS REFERENCE TO RELATED APPLICATIONS

This application is a continuation of U.S. patent application Ser. No. 14/345,630, which is the National Stage of International Application No. PCT/EP2012/068340, filed Sep. 18, 2012. The patent application identified above is incorporated here by reference in its entirety to provide continuity of disclosure.

FIELD

The present invention relates to a flywheel assembly and to a flywheel mass for use in such an assembly.

BACKGROUND

A previously proposed flywheel assembly comprises a flywheel mass having a hole extending through it along a rotational axis about which the flywheel mass spins in use. An axle extends through the hole of the flywheel mass such that the axle forms an interference fit with the flywheel mass. In this configuration rotating the axle causes the flywheel mass to rotate about the rotational axis.

Flywheel assemblies like the one described above are used to store energy in the form of kinetic energy. For example, the translational kinetic energy of a car may be transferred to the rotational kinetic energy of an onboard flywheel assembly when the car stops rather than being dissipated as heat in the car's brakes. The rotational kinetic energy may then later be recovered and transferred to translational kinetic energy of the car by mechanically linking the rotating flywheel assembly to a wheel axle of the car. A flywheel assembly may also be used to store energy generated by an intermittent power source such as a solar powered motor. For example, when such a motor is energised it may be used to rotate a flywheel assembly such that later on, when the motor is no longer energised, energy may be recovered from the rotating flywheel assembly by using the flywheel assembly to rotate one or more magnets for electromagnetic induction purposes (i.e. to generate electricity).

It will be appreciated that the amount of energy $E_K$ capable of being stored by a rotating flywheel assembly is governed by the equation $$E_K = \frac{1}{2}I\omega^2$$

wherein I is the moment of inertia of the flywheel assembly and ω is the angular velocity at which the assembly rotates. Therefore, in order to increase the amount of energy stored by a flywheel assembly it is necessary to increase the speed at which the assembly rotates. However, if a flywheel mass is rotated at high speed, stresses induced by centrifugal forces on the flywheel mass of the assembly may cause the flywheel mass to deform thereby leading to various potential problems.

One such problem is that a flywheel mass can disengage from a flush contact fit with the rotating axle as the mass deforms in a direction away from the axle. If this should happen, then the flywheel mass may move relative to the axle in spite of any axial clamping forces, such movement likely to be radially to one side. Once this has occurred, the flywheel mass is unbalanced and will tend to create load that can either damage the bearings of the flywheel assembly and/or create unwanted vibrations.

It is also possible that the flywheel mass may slip relative to the axis in the tangential direction. This can also lead to loss of balance but also relative movement between the flywheel mass and axle. The mass may slow down and begin to retract until an interference fit is re-formed with the rotating axle. At the instant the flywheel mass reforms the interference fit, frictional forces between the flywheel mass and the rotating axle apply an impulse to the flywheel mass. The flywheel mass will again pick up speed by further rotation of the axle and the deformation, disengagement and retraction process will occur once again. However, repeated application of impulses to a flywheel mass increases the likelihood of the flywheel mass fracturing in use. As a consequence, there is a limit to the speed at which such flywheel masses can be rotated.

One previously proposed arrangement (shown in FIG. 1) for addressing this problem is described in PCT patent application number PCT/GB2011/000053. Looking at FIG. 1, this document discloses a flywheel apparatus 1 that comprises a deformable hub 2 which is fixed to an axle 3. A plurality of discs 4 are arranged in contact with an exterior surface of the hub 2 and a plurality of weights 5 are arranged in contact with an interior surface of the hub 2 to form a flywheel mass. In use, as the axle 3 rotates, so the hub 2 (and thus the discs 4 and weights 5) rotate with the axle. At high rotational speeds the discs 4 tend to deform in a direction away from the axle 3 (i.e. radially outwardly), and this would—in the absence of a deformable hub—cause the discs to separate from the hub. However, in the arrangement described in this document, centrifugal forces acting on the weights 5 are transferred to the hub 2 and these forces cause the hub 2 to outwardly deform so that it remains in contact with the discs 4 and the axle. As a result, the flywheel masses can be rotated at a higher speed than previously proposed arrangements.

Whilst this design does have the advantage that failure is likely only to occur in one disc atone instance as opposed to having a single mass through which a crack can propagate and cause all of the mass to fail in one go. This may occur if sufficient speed generated stresses induced by centrifugal forces in the discs 4 exceed a point where the discs 4 can fracture. If this should occur, disc fragments will be ejected from the apparatus at high speed and hence the flywheel mass must be contained in a suitable casing. It will be appreciated that the energy released when one disc fails is significantly less than that released if the entire mass should fail, and hence the containment casing for this assembly can be lighter than for an assembly with a single mass.

Unfortunately, one disadvantage associated with such a solution is that the cost of manufacturing the flywheel assembly is increased—principally due to the presence of both a hub 2 and weights 5 in addition to the one or more discs 4.

It would thus be advantageous if it were possible at a reasonable cost to both increase the amount of energy that can be stored by a flywheel assembly and reduce the risk of injury to people in the vicinity of the assembly in the event that the assembly should fail.

Another previously proposed flywheel assembly is disclosed in Japanese Patent Application no. 58215948 (Mitsubishi Electric Corp). In this assembly, the flywheel mass is comprised of a plurality of individual disks that are arranged in a stack between a top and a bottom plate. The disks between the top and bottom plates each include a locating projection on one surface that mates closely with a complementary depression on an opposing surface of the neighbouring disk in the stack (to thereby align the plates). The top and bottom plates are locally thickened towards the centre of the mass, and axle connecting plates are bolted to the locally thickened parts of the top and bottom disks so that the mass can be rotated around an axle.

This arrangement has numerous disadvantages. Firstly, the fact that the disks require closely cooperating projections and depressions means that the disks must be carefully machined to have the right shape. This increases the cost of manufacturing the assembly, and precludes this assembly from manufacture in regions of the world where access to such machinery is not readily available. Secondly, drilling into the top and bottom plates to enable the axial hubs to be attached inevitably weakens the plates, thereby increasing the risk of failure. Thirdly, the interlocking projections and depressions that align the plates and disks create stress points at each discontinuity that inevitably reduce the maximum speed at which the mass can be rotated.

Aspects of the present invention have been devised with the foregoing issues in mind.

SUMMARY

In accordance with one presently preferred implementation of the teachings of the present invention, there is provided a flywheel assembly comprising: at least one flywheel mass support, the or each said support having a shaft that extends along a rotational axis about which the support can rotate in use, the or each said support comprising a plurality of openings that are each offset from said rotational axis, a flywheel mass comprising a plurality of openings that are each arranged to align with a corresponding opening in said support; and means for coupling said flywheel mass to the or each said support so that the mass can rotate with the or each support in use, said coupling means being configured to extend through the aligned openings in the or each support and said flywheel mass.

An advantage of this arrangement is that the flywheel mass can be rotated at higher speeds and hence can store higher amounts of kinetic energy than previously proposed flywheels. It is also the case that at a given angular velocity ω, this flywheel mass is less likely to fracture than previously proposed arrangements.

In one implementation, the openings in at least one of said mass and the or each support are substantially circular. The openings in at least one of said mass and the or each support may instead be non-circular.

The openings in said mass and the or each support may have the same shape. Alternatively, the openings in said mass and the or each support may have different shapes that complement one another so that an opening in said mass can be aligned with an opening in the or each said plate.

The openings in at least one of the or each support and said mass may comprise a primary region and an auxiliary region. The primary and auxiliary regions may have the same or different cross-sectional shape. Centre points of the primary and auxiliary regions may be equidistant from said rotational axis.

In one arrangement said primary region may comprise a part-circle having a first diameter, and said auxiliary region may comprise a part circle having a second diameter that is less than said first diameter.

The flywheel mass may comprise a plurality of flywheel elements sandwiched together, each said element including a plurality of openings, said flywheel elements being configured so that openings in respective elements align with one another when the elements are sandwiched together.

The coupling means may comprise a plurality of fixing members, each said fixing member being configured to extend through an aligned set of openings defined by the flywheel elements.

The or each said support may comprise a plate in which said openings are provided and from which said shaft extends. The plate and said shaft may comprise a single element, or two discrete elements that are fixedly coupled one to the other.

In one arrangement the assembly may comprise two supports, each said support comprising a plate from which a shaft extend, said flywheel mass being sandwiched between the plates of the supports so that the shafts of each support are aligned with one another and extend along the same rotational axis.

Another aspect of the present invention relates to a flywheel mass for use in the flywheel assembly described herein, the flywheel mass defining one or more openings that are each offset from a rotational axis about which the flywheel element is configured to rotate in use.

A yet further aspect of the invention relates to a flywheel assembly comprising: first and second flywheel mass supports, each said support having comprising a plate and a shaft that extends from the plate along a rotational axis about which the support can rotate in use, each said support further comprising a plurality of openings that are each offset from said rotational axis, a flywheel mass comprising a plurality of openings that are each arranged to align with corresponding openings in each of said supports; and means for coupling said flywheel mass to each said support so that the mass is sandwiched between respective plates of the supports and the respective shafts of the supports extend in opposite directions along the same rotational axis, said coupling means being configured to extend through the aligned openings in the first support, through the flywheel mass, and through the openings in the second support.

In general terms, arrangements embodying the teachings of the invention have one or more of the following advantages: (i) a flywheel mass with a plurality of flywheel elements will tend to release a smaller fraction of the flywheel mass in the event of a structural failure of the mass; (ii) a flywheel mass consisting of a plurality of elements aligned and coupled together at radially outward locations reduces axial stresses that tend to promote fracture over yielding (plastic deformation); (iii) the design of the openings through the flywheel elements reduces stress concentrations so that it becomes possible to operate the flywheel assembly to stress levels comparable to those of a design where the flywheel mass has no openings (i.e. stress levels at the openings are equal to or less than those found at the axial centre of the mass); and (iv) the provision of a support where the bolts do not protrude reduces aerodynamic windage induced drag.

Other features, aspects, embodiments and advantages of the teachings of the invention will be apparent from the remainder of this specification.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 2 is a schematic perspective view of an envisaged flywheel assembly;

FIG. 3 is a schematic perspective view of a flywheel element comprising part of the flywheel assembly shown in FIG. 2;

FIG. 4 is a schematic perspective view of a shaft and plate for coupling to the flywheel element shown in FIG. 3;

FIG. 10 is a side view of another envisaged flywheel assembly;

FIGS. 11 & 12 are graphical representations of some illustrative ways in which a bolt (or bolts) may extended through the openings shown in FIGS. 5 & 6;

DETAILED DESCRIPTION OF PREFERRED EMBODIMENTS

Figure 1:
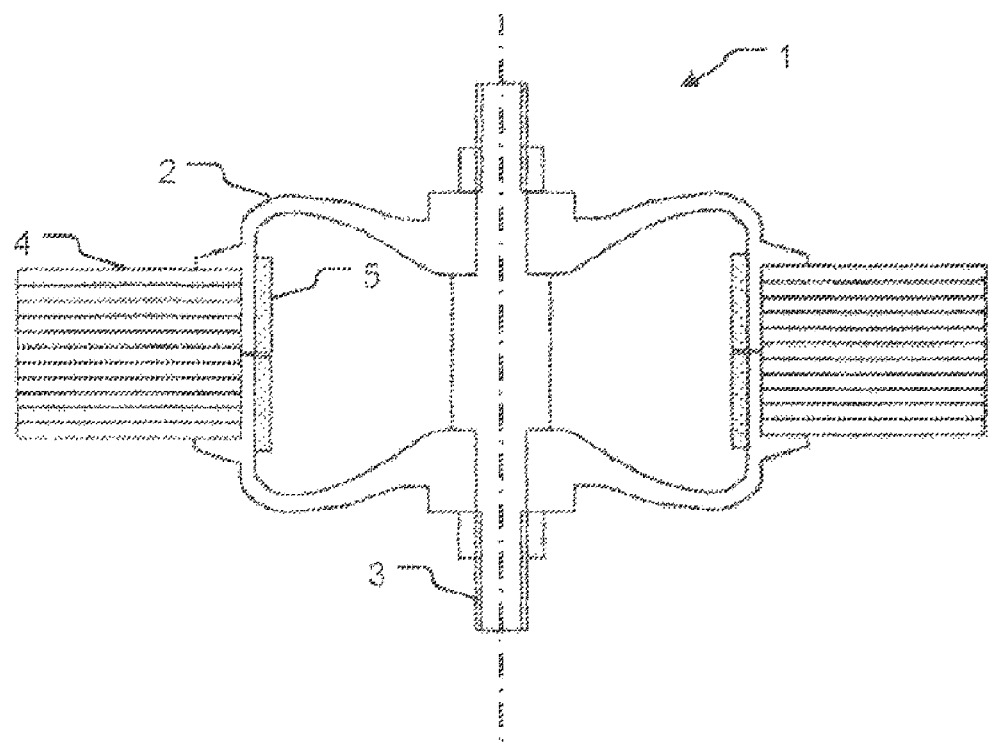
FIG. 1 is a schematic cross sectional view of a prior art flywheel assembly.

FIG. 2 is a schematic representation of an envisaged flywheel assembly 10 that comprises a flywheel mass 12 that is sandwiched between, and coupled to, two flywheel mass supports 14.

Looking at FIG. 3 the flywheel mass 12 comprises a body with one or more through-holes 16 that are each radially offset from a rotational axis 18 about which the flywheel mass 12 spins in use.

As shown in FIG. 4, each flywheel support 14 comprises a plate 20 and an axial shaft 19 that defines the aforementioned axis 18 about which the plate 20 can rotate. The plate 20 includes two or more through holes 22 that are each radially offset, such holes being offset from the shaft 19. The holes 22 are positioned so that they are able to align with the holes 16 in the flywheel element 12 when the plate 20 is abutted against the flywheel mass 12. In one particular arrangement the holes 22 defined by the plate 20 have cross-sectional shapes that are at least complementary, and in one envisaged arrangement correspond (at least approximately), to those of the holes 16 in the flywheel mass 12.

Figure 14:
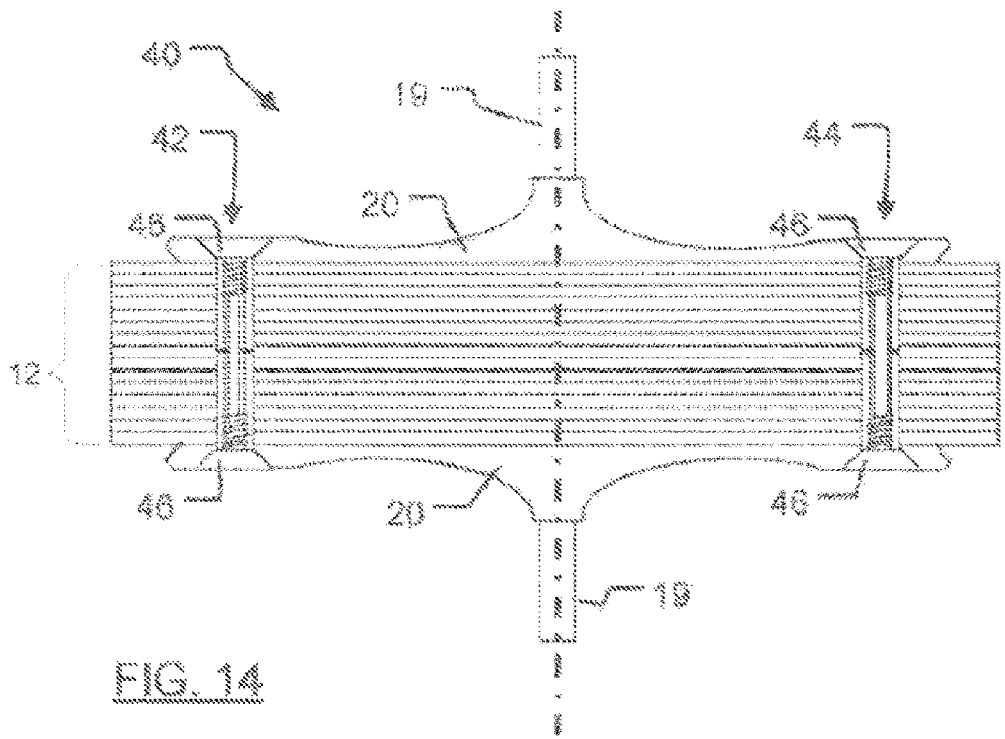
FIG. 14 is a schematic representation of another flywheel assembly.

The flywheel assembly 10 is formed by abutting one plate 20 against an upper surface 13 of the flywheel mass 12 and another plate 20 against a lower surface 15 of the flywheel mass 12. The holes 22 defined by the plates 20 are then aligned with the holes 16 in the flywheel mass 12 before the plates 20 are secured to the flywheel mass 12 by inserting a suitable fixing element 23 (such as a bolt, pin, rod or stub shaft) through the aligned holes 16, 22, and securing the fixing element in place so that the plates are tightly coupled to the flywheel element 12. Once assembled the flywheel assembly 10 can then be rotated about its rotational axis 18 to store kinetic energy. In FIG. 10, the fixing elements illustrated in the drawing protrude from the plate and whilst this arrangement functions adequately, it would advantageous to use elements that project to a lesser extent (preferably, elements that lie flush with the plate) to reduce windage losses (FIG. 14 illustrates one envisaged arrangement that reduces windage losses).

As will be appreciated, in this arrangement the plate(s) are coupled to the mass solely by means of the fixing elements that extend through the plate(s) and the mass, rather than being bolted to the mass (as in the aforementioned Mitsubishi arrangement). This arrangement is advantageous as it avoids the potential for stress-induced failure at the holes drilled into the mass (which holes engage with the bolts to hold the mass to the support).

In one arrangement the flywheel mass 12 includes one pair of holes 16. In this arrangement the holes are (at least roughly) equidistant from, and linearly aligned with respect to, the rotational axis 18. In another arrangement the flywheel mass 12 also defines one or more additional holes 16, each such hole being located the same distance away from the rotational axis 18. For example, in the particular arrangement shown in FIG. 3 the flywheel mass 12 includes two pairs of holes and the holes of each pair fall on a notional line running through the rotational axis 18, and are (at least roughly) equidistant from the rotational axis 18 of the flywheel mass 12.

Figure 5:
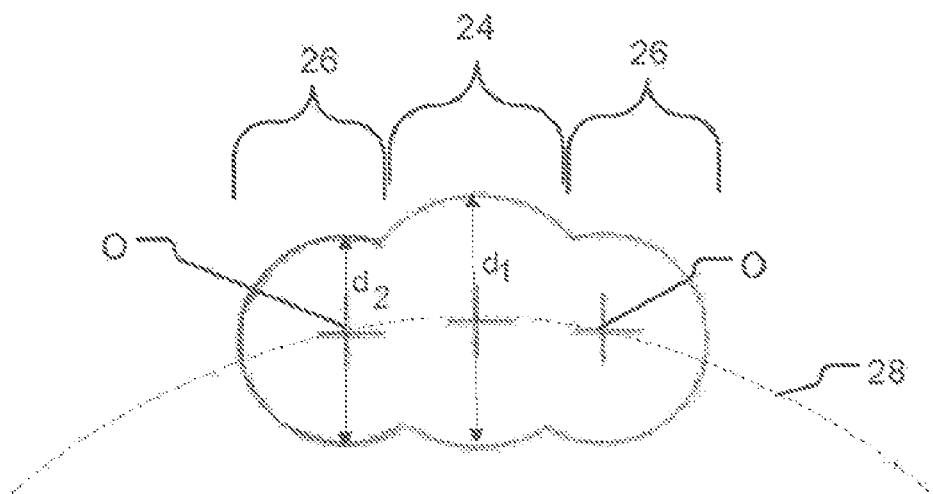
FIG. 5 is a schematic representation of one envisaged flywheel opening.

The holes 16 in the flywheel mass 12 (and plate 20) may, in one envisaged implementation, be circular in shape. In another arrangement, one or more such holes may instead be non-circular, and optionally be made up of a plurality of regions. For example, the hole shown in FIG. 5 has a primary region 24 of a first cross-sectional shape and a first pair of auxiliary regions 26 each of which has a second cross sectional shape (which may or may not be the same as the first cross-sectional shape). In the particular arrangement shown in FIG. 5, the primary region 24 comprises a part-circle having a first diameter $d_1$, and the auxiliary regions 26 comprise part-circles with a second diameter $d_2$ that is smaller than that of the primary hole region (and preferably equal to one another). As shown in FIG. 5, the auxiliary regions 26 are located to either side of the primary region and open into the primary region 24. In a preferred implementation, at least the centres "O" of the part-circles that form the auxiliary regions are equidistant from the axis of the plate/flywheel mass and hence arranged along a curve 28. In the particular arrangement shown in FIG. 5, the part-circles that form the primary and auxiliary regions are arranged along the same curve.

Figure 6:
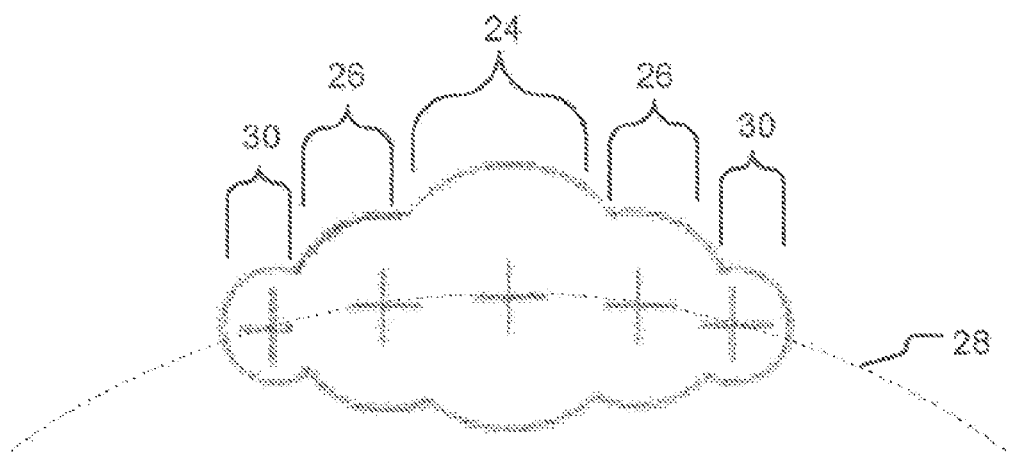
FIG. 6 is a schematic representation of another envisaged flywheel opening.

Referring now to FIG. 6, it is also envisaged that a hole may further comprise one or more additional pairs of auxiliary regions (such as the second pair of auxiliary opening portions 30). In the particular arrangement depicted in FIG. 6, the part-circles that define the primary and each auxiliary region are all equidistant from the axis of the plate/flywheel element and hence arranged along the same curve 28. In other envisaged arrangements, the centres of the part-circles that comprise the second auxiliary openings may be located along a curve having a different radius to that of the curve along which the part-circles that comprise the primary auxiliary openings are located, and the curve on which the primary region is located may have the same radius or a different radius to that of the first or second auxiliary regions.

In one envisaged implementation the plates and the flywheel mass have holes that are the same shape. It will be appreciated, however, that this is not essential and that it will suffice if the plates and flywheel mass have holes that complement each other. For example, in one envisaged arrangement the mass may have a plurality of through holes of the type depicted in FIG. 5, and the plates may comprise a plurality of circular holes each arranged to align with one of the primary 24 or auxiliary 26 regions of a flywheel hole. It will also be appreciated that it is not essential for the holes to comprise a pair of auxiliary regions; they could instead comprise a single primary region and a single auxiliary region. Yet further arrangements will be apparent to persons of ordinary skill in the art.

Figure 7:
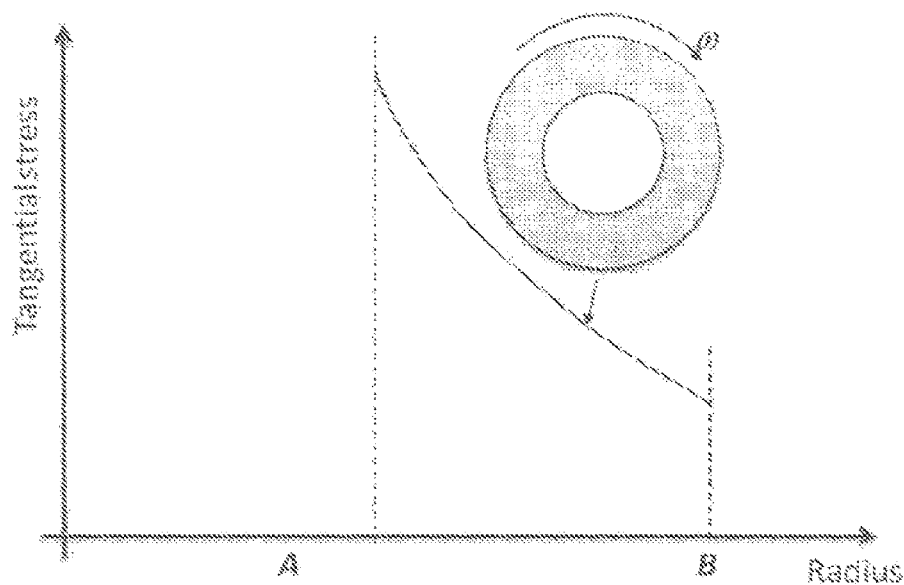
FIG. 7 is graphical representation of the stress-radius relationship of a flywheel element rotating at an angular velocity w, the flywheel element having a circular aperture extending through its centre along its rotational axis.
Figure 8:
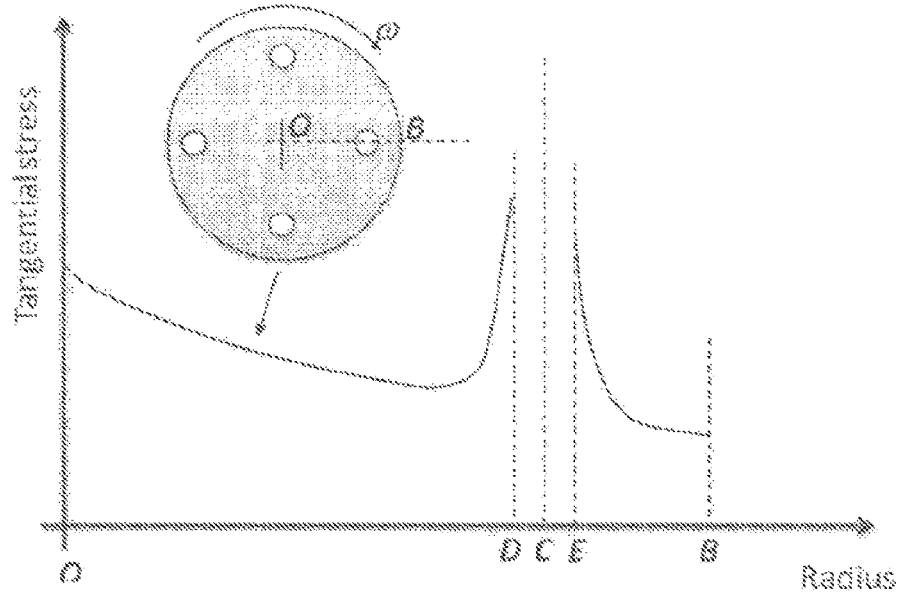
FIG. 8 is a graphical representation of the stress-radius relationship of a flywheel element rotating at an angular velocity ω, the flywheel element not having a central aperture extending along its rotational axis but instead defining four holes that are offset from the rotational axis.
Figure 9:
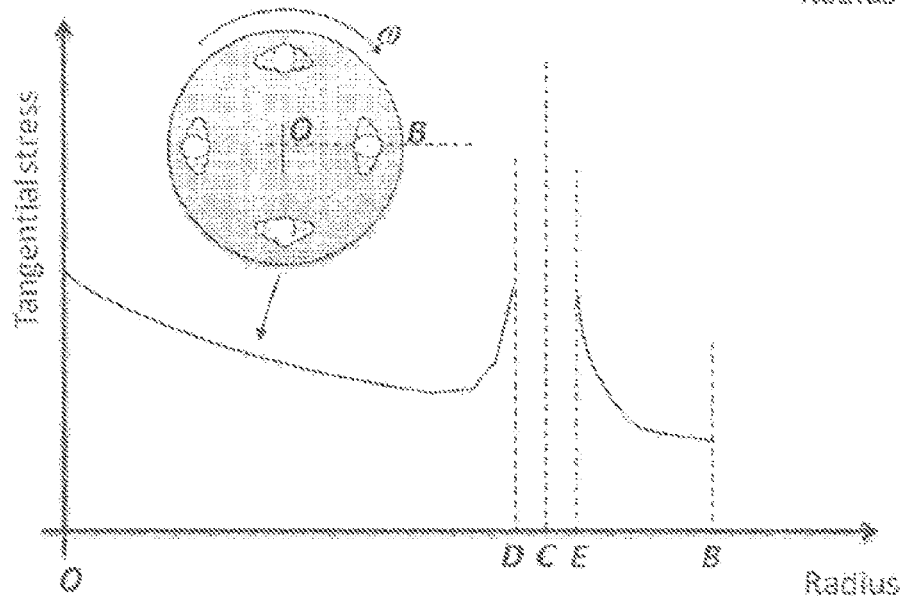
FIG. 9 is a graphical representation of the stress-radius relationship of a flywheel element rotating at an angular velocity ω, the flywheel element defining four holes of the shape shown in FIG. 6 such holes being offset from the rotational axis.

FIGS. 7 to 9 illustrate the relationship between i) the radius of a flywheel element and ii) the tangential stress on the mass that is created by centrifugal forces when such a flywheel mass is rotated at an angular velocity ω.

FIG. 7 illustrates the stress-radius relationship of a flywheel mass rotating at an angular velocity ω, the flywheel mass having a constant thickness and a circular aperture extending through its centre along its rotational axis. As shown in FIG. 7, this flywheel mass experiences the highest amount of stress from centrifugal forces in use at the innermost surface of the flywheel mass (at radius A) i.e. the surface defining the aperture through the centre of the flywheel mass. In contrast, the outermost surface of the flywheel mass (at radius B) experiences the least amount of stress from centrifugal forces.

FIG. 8 illustrates the stress-radius relationship of a flywheel mass rotating at an angular velocity ω, the flywheel mass having a constant thickness and no central aperture extending along its rotational axis but instead defining four holes that are offset from the rotational axis. As shown in FIG. 8, this flywheel mass experiences the highest amount of stress from centrifugal forces in use at the innermost surface of each hole (at radius D), i.e. that surface closest to the rotational axis (at radius O). The outermost surface of each hole (at radius E), i.e. that surface furthest from the rotational axis (at radius O), experiences slightly less stress from centrifugal forces than the innermost surface (at radius D). The outermost surface of the flywheel mass (at radius B) experiences the least amount of stress from centrifugal forces in use.

FIG. 9 illustrates the stress-radius relationship of a flywheel mass rotating at an angular velocity ω, the flywheel mass having a constant thickness and defining four holes of the shape shown in FIG. 6, such holes being offset from the rotational axis. As shown in FIG. 9, this flywheel mass experiences the highest amount of stress from centrifugal forces in use at the innermost surface of each hole (at radius D) i.e. that surface closest to the rotational axis (at radius O). The outermost surface of each hole (at radius E), i.e. that surface furthest from the rotational axis (at radius O), experiences slightly less stress from centrifugal forces than the innermost surface (at radius D). The outermost surface of the flywheel mass (at radius B) experiences the least amount of stress from centrifugal forces in use. Since the maximum stress at the aperture (at radius D) is lower than the stress at the disc centre (at radius O), the maximum stress for this geometry is the same as a plane disc without any apertures. It follows, therefore, that such a disc with apertures, creating a useful machine, can operate at the same speed and store the same energy as a disc without apertures.

As shown in FIGS. 7 to 9, a flywheel mass having an aperture along its rotational axis experiences the highest amounts of stress from centrifugal forces when rotated at angular velocity ω. Such flywheel masses are thus likely to fracture at slower rotational speeds than flywheel masses of the type shown in FIGS. 8 & 9. One consequence of this is that flywheel masses of the type shown in FIGS. 8 & 9 can be rotated at higher speeds and hence can store higher amounts of kinetic energy than those of the type shown in FIG. 7. It is also the case that at a given angular velocity ω, the flywheel masses shown in FIGS. 8 and 9 are less likely to fracture than the mass depicted in FIG. 7.

In another envisaged arrangement (depicted schematically in FIG. 10) the flywheel mass 12 of the fly wheel assembly 10 may comprise a plurality of generally planar flywheel elements 15 stacked on top of one another. In such an arrangement plates 20 are engaged with the upper and lower flywheel elements 15 such that the shafts 14 coupled thereto extend along the rotational axis of the flywheel elements. To secure the assembly together, the holes 16 defined by the respective flywheel elements 15 and the holes 22 defined by the plates 20 are aligned such that a fixing element 23 (for example a bolt, pin, rod or stub shaft) may be extended through each aligned set of holes and secured in place, thereby coupling the flywheel elements 12, plates 20 and shafts 19 together. As will be appreciated by persons of ordinary skill in the art, the elements are located with respect to one another solely by means of the bolts that extend through the openings in the elements, and hence require no complex machining of the type required to form the complementary steps and recesses of the aforementioned Mitsubishi arrangement that function to align the elements with respect to one another. The arrangement presently employed also avoids the stress concentrations that occur at the step/recess interfaces of the Mitsubishi arrangement.

An advantage of this arrangement is that a flywheel consisting of a set of flywheel elements (which release less energy in the event of a flywheel element fracture than a flywheel made from a single mass) can be operated at the same speed as a disc without apertures. This reduces the weight and cost of the containment system which is required to reduce the likelihood of mass parts being ejected in the event of a flywheel mass failure. Additionally, the cost of manufacture and assembly of such a design is further reduced since the flywheel elements are generally planar and can therefore be stamped (or otherwise formed) from sheet metal material with little additional processing to form the majority of the flywheel assembly. This makes such a flywheel design attractive for use in automotive energy recovery systems and ground based power applications particularly as an alternative to composites structures. The resulting flywheel also operates at a lower peripheral speed than a composite flywheel for a given amount of energy stored, and hence windage losses are reduced.

In the case of application of this invention to developing countries as a means of ground power storage, one advantage of this arrangement is that if one or more elements should be damaged, then only those elements need to be replaced. Assembly and repair of this design therefore simpler than other designs and can be done in workshops with more limited specialist equipment.

Various ways of using a fixing element 23 to secure a plate 20 and one or more flywheel elements 12 together are shown in FIGS. 11 & 12. For example, a fixing element 24 may be extended through only one of the opening portions of a hole. Alternatively, fixing elements 24 may be extended through two or more of the opening portions of a hole. An advantage of the arrangements proposed is that a variety of different sized fixings can be used to assemble the flywheel assembly.

Figure 13A:
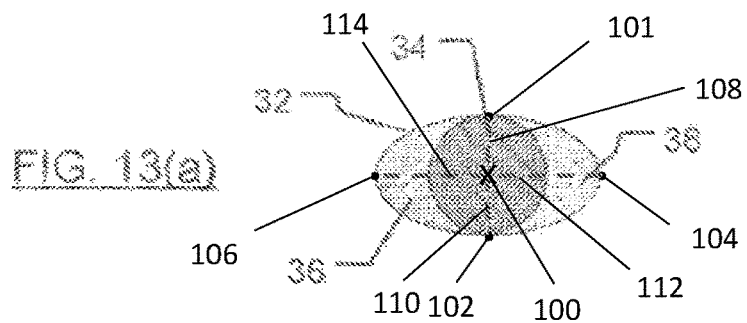
FIGS. 13(a) to 13(c), there are depicted three schematic representations of other holes that may be formed through a flywheel mass.
Figure 13B:
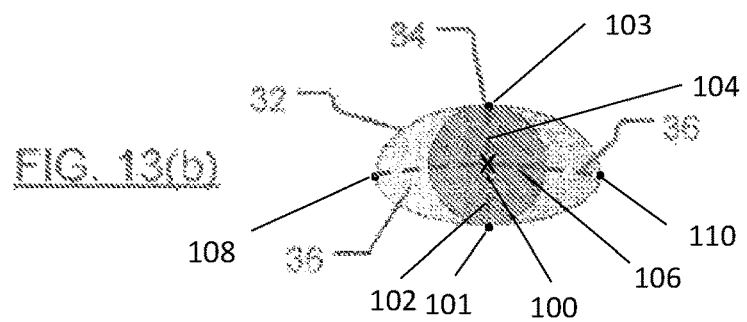
Figure 13C:
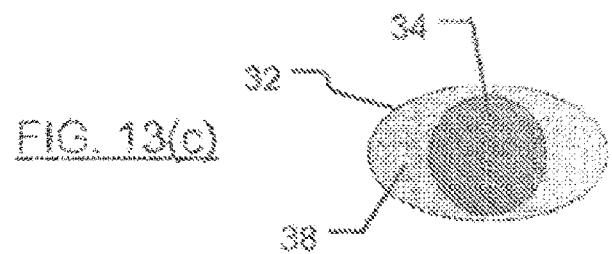

Referring now FIGS. 13(*a*) to 13(*c*), there are depicted three schematic representations of other holes that may be formed through the flywheel mass. FIG. 13(*a*) is a schematic view of a hole 32 through the flywheel mass that has a predominantly elliptical shape in order to reduce stress in the discs that make up the flywheel mass. A bolt 34 passes through the hole 32, and inserts 36 have been added between the bolt and the hole in order to stabilise the bolt position. In one envisaged arrangement the inserts may be made from a low density material such as hard polymer or light metal alloy. In this particular arrangement, the hole 32 is (at least generally) symmetrical but it can be beneficial to make the shape asymmetric to further reduce stress as shown in FIG. 13(*b*). The asymmetrical, predominantly elliptical, shape of FIG. 13(*b*) is defined by a center point 100 of the hole 32 being separated from a first co-vertex 101 by a first semi-minor axis 102 which is longer than a second semi-minor axis 104 separating the center point 100 from a second co-vertex 103. This asymmetrical, predominantly elliptical, shape of FIG. 13(*b*) may also be described as being defined by a curved major axis 106 connecting vertexes 108, 110 of the shape with the center point 100 of the shape, the curved major axis 106 having a turning point on the center point 100. This is in contrast to the symmetrical, elliptical, shape of FIG. 13(*a*). In another arrangement, the two inserts per hole may be replaced with one insert 38 by reducing the size of the bolt 34. This arrangement makes assembly easier, but may increase the stress by virtue of the increased size of the hole.

Referring now to FIG. 14, there is depicted a schematic representation of another flywheel assembly 40. The flywheel assembly of this embodiment is similar in many respects to those of other embodiments, but differs in that in this embodiment the plates 20 are configured so that the bolts do not protrude from the outer surface of the plate (thereby reducing windage losses).

The discs 12 that make up the flywheel mass and the plates 20 are clamped together by bolts 42, 44 prior to operation of the flywheel assembly 40, and as before the plates 20 function to connect the flywheel mass to the shafts 19. The plates 20 can be of a more complex design than the flywheel discs since only two plates are required in this embodiment. The plates are configured to reduce stresses in the flywheel mass and also to support the bolts 42, 44.

In one envisaged arrangement, the bolts 42, 44 each consist of two countersunk machine screws 46 that are internally threaded, and with which an outwardly threaded rod 48 may be engaged. By providing internally threaded screws, the discs of the flywheel mass locate on the relatively smooth outside surface of the machine screws thereby avoiding locating on external threads which would be inaccurate. In a preferred arrangement a small gap 50 exists between the screws 46, so that the middle disc of the flywheel mass is still located without losing the damping force provided by the bolts 42, 44.

Figure 15:
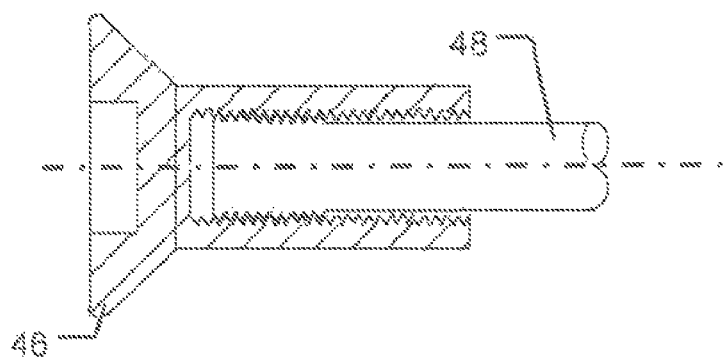
FIGS. 15 and 16 are schematic cross-sectional representations of illustrative machine screws.
Figure 16:
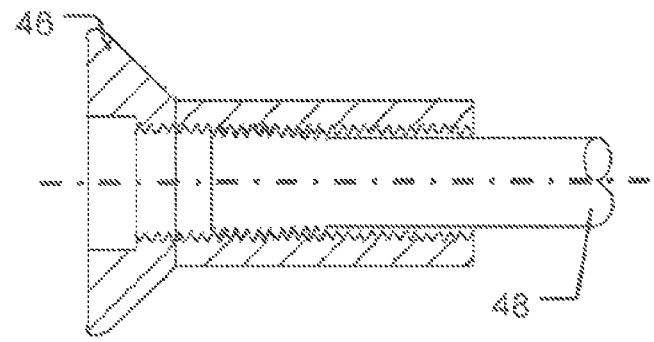

FIGS. 15 and 16 are schematic cross-sectional representations of illustrative machine screws. In FIG. 15, the internally threaded machine screw is shown connected to part of the rod 48. Tension is created in the bolt by applying torque to both of the machine screws against each other when looking down the axis of the bolt. In FIG. 16 there is depicted an alternative design of machine screw. In this arrangement the rod 48 can penetrate right through the machine screw in order to avoid a blind hole. In this arrangement, a feature on the machine screw (such as a hexagonal socket) for applying torque must be larger than the threaded hole through the screw.

Figure 17:
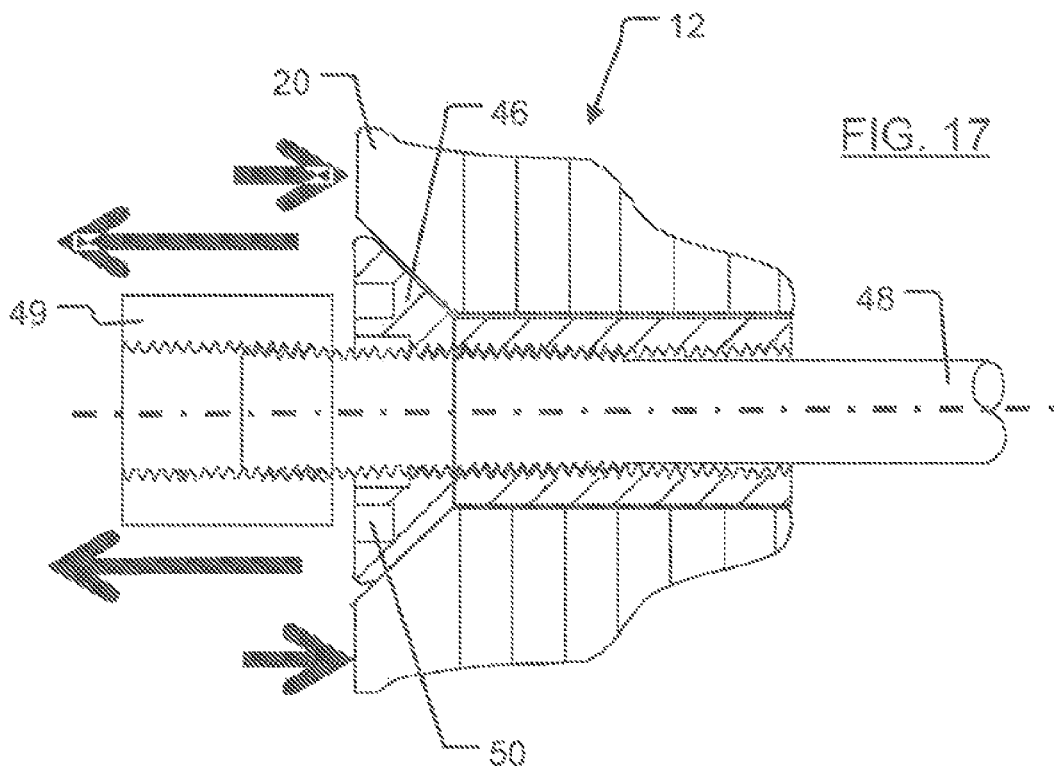
FIG. 17 shows an alternative arrangement for tensioning the bolts.

FIG. 17 shows an alternative arrangement for tensioning the bolts. In this arrangement the rod 48 protrudes beyond the machine screw 46 on one side and a nut 48 is threaded onto the protruding thread. Mechanical apparatus (the like of which is known in the art) is used to pull the nut in the direction of the longer arrows whilst the apparatus presses against plate 20. Such apparatus is well known to one skilled in the art and has apertures so that the machine screw can be turned by engaging a tool with locating features 50 formed in the screw 46. Little torque needs to be applied to the locating features 50 because once the mechanical apparatus releases the force, significant tension is created in the bolts. After this operation, the protruding rod can be removed by cutting or other form of machining. By connecting the bolts together in this way, the correct level of tension may be applied to the bolt and the finished flywheel assembly is inherently less easy to tamper with.

Figure 18:
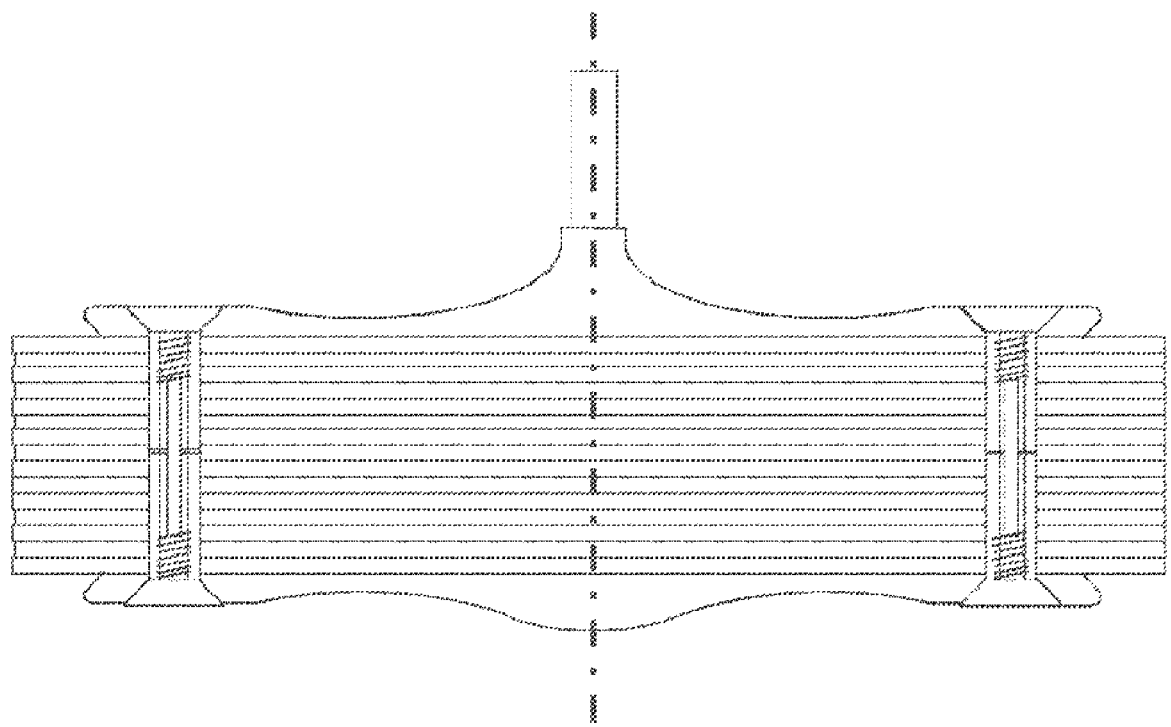
FIG. 18 is a schematic representation of another flywheel assembly.

FIG. 18 is a schematic representation of another arrangement where the flywheel is relatively short. In this arrangement bearing support for the flywheel is only required on one side, and by virtue of this arrangement one of the plates can be lightened with the shaft normally required for bearing location removed.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, in one envisaged arrangement one or more shafts 19 may be secured directly to the flywheel element 20 in FIG. 3 such that the or each shaft 19 extends along the length of the rotational axis 18. Furthermore, it is also envisaged that the holes through the flywheel mass and plates need not necessarily be made from sets of circular holes although these are simple to create by means of drilling operations. Non circular holes can be used to reduce stresses in the aperture further but such holes require more complex machinery to create. Creating apertures of this type can be done using water jet, laser cutting or stamping.

In another envisaged arrangement, the flywheel mass need not necessarily be sandwiched between a pair of supports but could instead be coupled to a single support. For example, if the support were to be vertically orientated (so that the flywheel mass rotates around a vertical axis), a second support plate may be unnecessary. A second support may also be unnecessary if means, other than a second support, are provided to levitate the flywheel mass. For example, the flywheel mass may comprise one or more magnets, and a housing within which the flywheel mass rotates may comprise a further magnet, the magnet on the housing and the magnet(s) on the flywheel mass being arranged so that like poles face one another.

It should also be noted that whilst the accompanying claims set out particular combinations of features described herein, the scope of the present invention is not limited to the particular combinations hereafter claimed, but instead extends to encompass any combination of features herein disclosed.

I claim:

1. A flywheel mass for an energy storage flywheel assembly, comprising:
    a plurality of generally planar flywheel mass elements forming a stack of flywheel mass elements,
    each one of the plurality of flywheel mass elements comprising a plurality of openings that align with the plurality of openings in adjacent ones of the plurality of flywheel mass elements in the stack of flywheel mass elements,
    wherein the plurality of flywheel mass elements is coupled together and aligned with one another to form said flywheel mass by means of a plurality of couplings that extend through an aligned set of the plurality of openings in said plurality of flywheel mass elements,
    wherein each opening of the plurality of openings in said plurality of flywheel mass elements has an asymmetrical, predominantly elliptical, shape.

2. The flywheel mass according to claim 1, further comprising:
    at least one insert per opening of the plurality of openings, arranged around the respective coupling extending through the aligned set of the plurality of openings in said plurality of flywheel mass elements.

3. The flywheel mass according to claim 2, wherein each opening is larger than a diameter of each coupling, so that the flywheel mass comprises only one insert per opening of the plurality of openings, which surrounds the respective coupling.

4. The flywheel mass according to claim 1, wherein a first semi-minor axis of the predominantly elliptical shape from a center to a first co-vertex is longer than a second semi-minor axis from the center to a second co-vertex.

5. The flywheel mass according to claim 1, wherein a major axis of the shape, connecting vertexes of the shape and a center of the shape, is a curved major axis, the curved major axis having a turning point on the center of the shape.

6. An energy storage flywheel assembly, comprising:
    at least one flywheel mass support having a shaft extending along a rotational axis about which the at least one flywheel mass support is rotatable,
        the at least one flywheel mass support comprising a first plurality of openings, each one of the first plurality of openings being offset from said rotational axis;
    a flywheel mass comprising a plurality of generally planar flywheel mass elements forming a stack of flywheel mass elements,
        each one of the plurality of flywheel mass elements comprising a second plurality of openings that align with the second plurality of openings in adjacent ones of the plurality of flywheel mass elements in the stack of flywheel mass elements,
        each one of the second plurality of openings being arranged to align with a corresponding one of the first plurality of openings of the at least one flywheel mass support; and
    a plurality of couplings for coupling said flywheel mass to the at least one flywheel mass support so that the flywheel mass is rotatable with the at least one flywheel mass support about the rotational axis,
        said plurality of couplings being configured to extend through an aligned set of the first plurality of openings in the at least one flywheel mass support and the second plurality of openings in said plurality of flywheel mass elements,
    the plurality of flywheel mass elements being coupled together and aligned with one another to form said flywheel mass solely by means of the plurality of couplings that extend through the aligned of the first plurality of openings in the at least one flywheel mass support and the second plurality of openings in said plurality of flywheel mass elements,
    wherein each opening of the second plurality of openings in said plurality of flywheel mass elements has a non-circular shape,
    wherein the energy storage flywheel assembly further comprises:
    at least one insert per opening of the second plurality of openings, arranged around the respective coupling extending through the aligned set of the first plurality of openings in the at least one flywheel mass support and the second plurality of openings in said plurality of flywheel mass elements.

7. The energy storage flywheel assembly according to claim 6, wherein each opening of the second plurality of openings is larger than the couplings, so that the flywheel mass comprises only one insert per opening of the second plurality of openings, which surrounds the respective coupling.

8. The energy storage flywheel assembly according to claim 6, wherein the non-circular shape is asymmetrical.

9. The energy storage flywheel assembly according to claim 6, wherein the at least one flywheel mass support comprises a plate from which the shaft extends and in which the first plurality of openings is provided.

10. The energy storage flywheel assembly according to claim 9, wherein the at least one flywheel mass support is comprised of two flywheel mass supports, and wherein the flywheel mass is attached to the two flywheel mass supports so that the flywheel mass is sandwiched between the plates of the two flywheel mass supports and so that the shafts of the two flywheel mass supports extend in opposite directions along the rotational axis.

11. The energy storage flywheel assembly according to claim 9, wherein said plate and said shaft comprise a single component.

12. The energy storage flywheel assembly according to claim 9, wherein said plate and said shaft comprise two separate components that are fixedly coupled to one another.

13. The energy storage flywheel assembly according to claim 6, wherein said plurality of couplings comprises a plurality of fixing members, each one of the plurality of fixing members configured to extend through the aligned set of openings of the second plurality of openings defined by the plurality of flywheel mass elements.

14. The energy storage flywheel assembly according to claim 6, wherein the at least one flywheel mass support is fixed to the flywheel mass only by means of the plurality of couplings that extend through the at least one flywheel mass support and the flywheel mass.

15. A flywheel mass for an energy storage flywheel assembly, comprising:
    a plurality of generally planar flywheel mass elements forming a stack of flywheel mass elements, each one of the plurality of flywheel mass elements comprising a plurality of openings that align with the plurality of openings in adjacent ones of the plurality of flywheel mass elements in the stack of flywheel mass elements, wherein the plurality of flywheel mass elements is coupled together and aligned with one another to form said flywheel mass by means of a plurality of couplings that extend through an aligned set of the plurality of openings in said plurality of flywheel mass elements, wherein each opening of the plurality of openings in said plurality of flywheel mass elements has a non-circular shape, wherein:

the non-circular shape is a curved ellipse, in which:

a first semi-minor axis from a center of the shape to a first co-vertex is longer than a second semi-minor axis from the center of the shape to a second co-vertex; and/or a major axis of the shape, connecting vertexes of the shape and a center of the shape, is a curved major axis, the curved major axis having a turning point on the center.

\* \* \* \* \*